(12) United States Patent  
Popov

(10) Patent No.: US 6,292,460 B1  
(45) Date of Patent: *Sep. 18, 2001

(54) RE-USABLE INFORMATION RECORDING MEDIUM

(75) Inventor: Yury Popov, Strovolos (CY)

(73) Assignee: Camena Est, Vaduz (LI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,119

(22) Filed: Jul. 9, 1999

(30) Foreign Application Priority Data

Jul. 5, 1999 (WO) .................. PCT/EP99/04724

(51) Int. Cl.$^7$ .................. G11B 3/70; G03C 5/24
(52) U.S. Cl. .......................... 369/288; 430/269
(58) Field of Search .................. 369/288, 13, 283, 369/275.2, 275.1; 428/212, 694 ML, 694 R, 402; 430/269, 327, 348, 349, 56, 61, 154

(56) References Cited

U.S. PATENT DOCUMENTS

| 3,673,597 | 6/1972 | Horst et al. ................ 346/74 TP |
| 3,982,334 | 9/1976 | Tate ............................. 35/66 |
| 4,293,634 | * 10/1981 | Monosov ..................... 430/269 |
| 4,438,443 | 3/1984 | Doev et al. ............... 346/153.1 |
| 5,342,682 | * 8/1994 | Vogelgesang et al. ....... 428/325 |

FOREIGN PATENT DOCUMENTS 5-9227489   12/1984   (JP) .

* cited by examiner

Primary Examiner—Ali Neyzari  
(74) Attorney, Agent, or Firm—Pennie & Edmonds LLP

(57) ABSTRACT

A re-usable information recording medium provided with a sensitive layer which comprises a plurality of particles having a magnetically responsive position, and a retaining material embedding the particles and having a temperature dependent viscosity, the particles and the retaining material exhibiting light absorption spectra which are different one from the other.

39 Claims, 3 Drawing Sheets

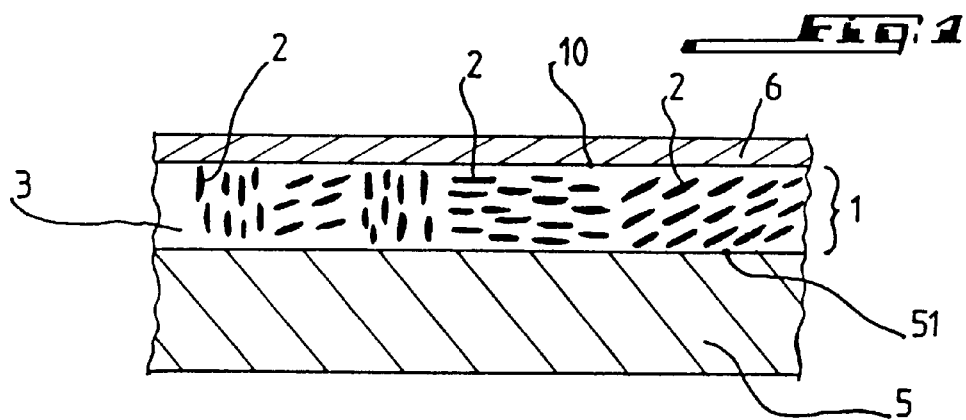
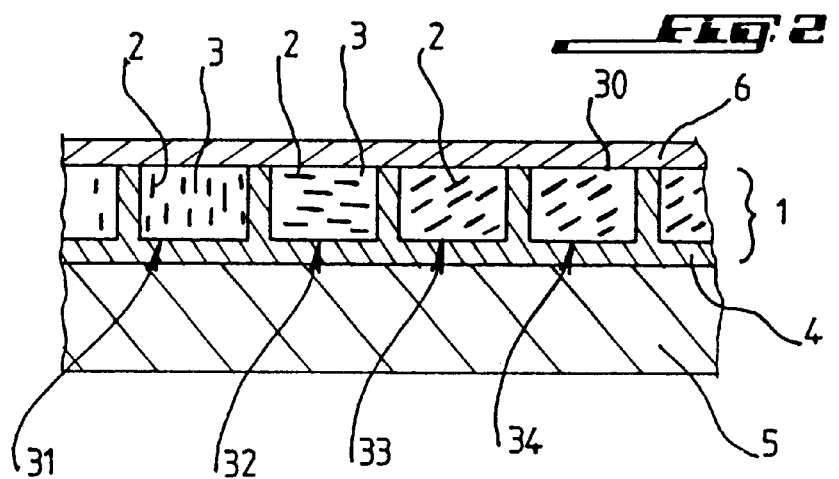
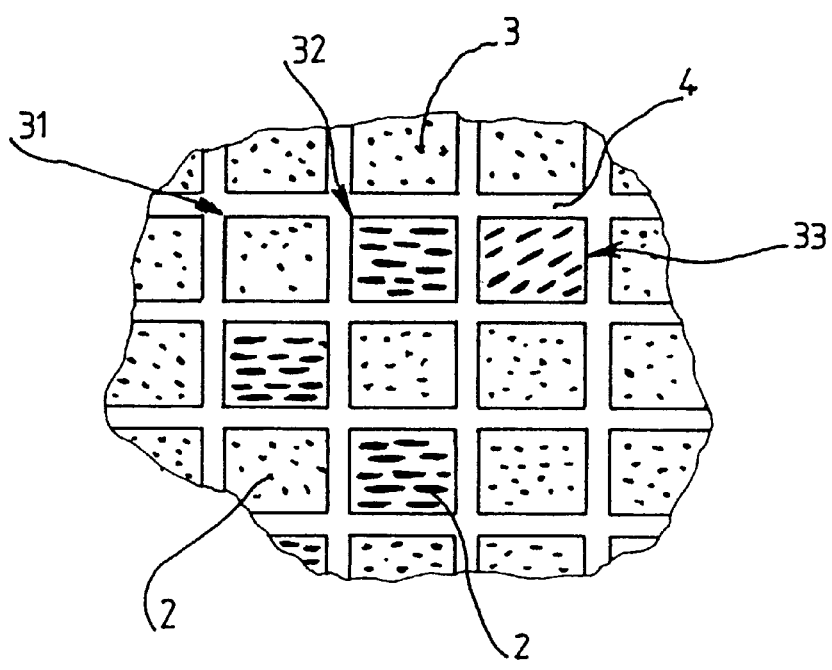

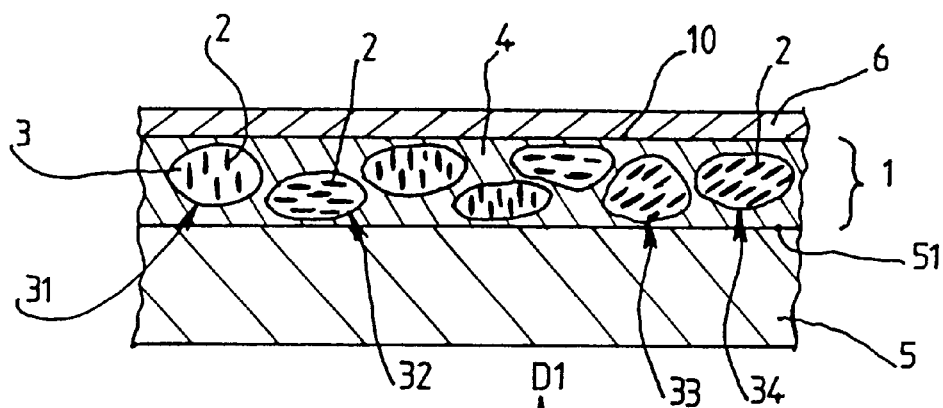
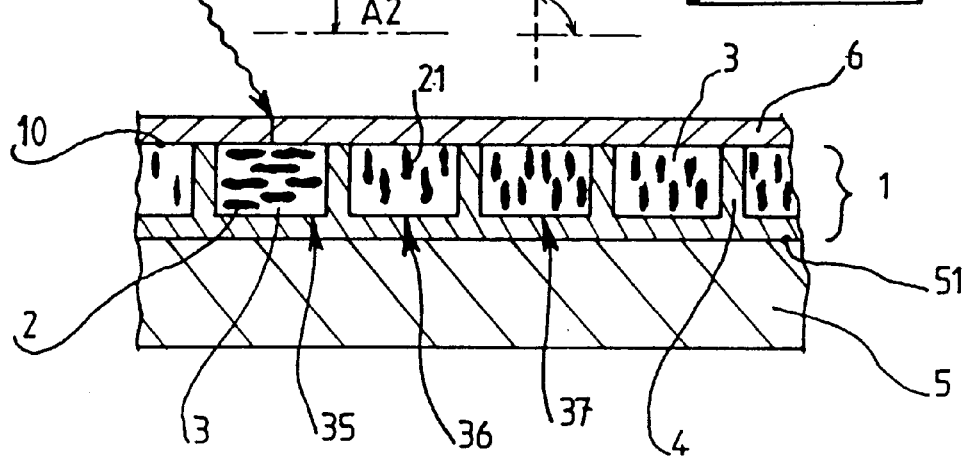
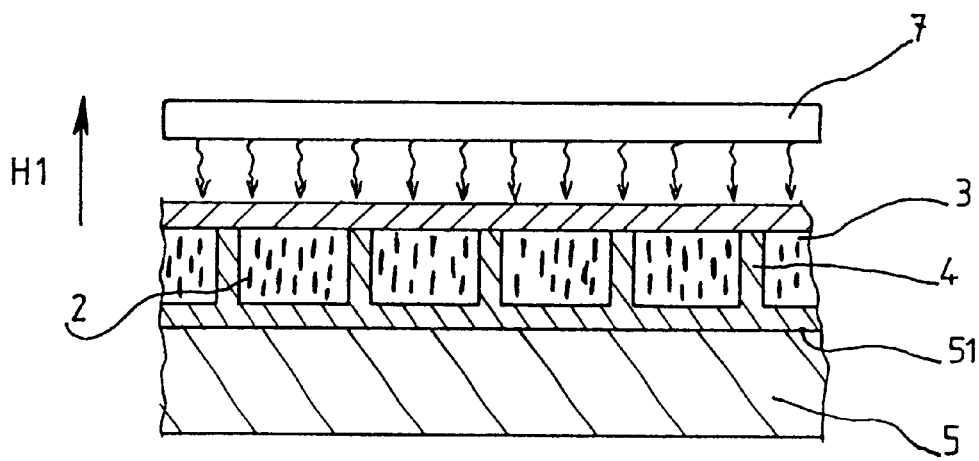

RE-USABLE INFORMATION RECORDING MEDIUM

FIELD OF THE INVENTION

The invention generally relates to the recording of information of any kind, such as analog or digital pictures, symbols, data, or the like.

The invention more particularly relates to a reusable information recording medium provided with a sensitive layer, and to a method of using such a medium for recording various elements of information.

BACKGROUND OF THE INVENTION

The need for recording information is as old as mankind, and has received solutions without number, such as painting, writing, photography, etc.

During the past 50 years, the development of computer science, the market globalization, and the consideration of environmental requirements have increased the need for re-usable information recording media, such as magnetic memories, recording tapes or discs, in which information, once recorded, is retained without consumption of energy.

More recently, the improvements of technology have increased the need for information recording media, such as re-usable optical discs, in which information can be stored with a very high density and still retained without consumption of energy.

An example of such a solution is given for instance in the published French patent application FR 2 726 116.

However, the re-usable information recording media presently known and adapted to the information recording by a computer fail to offer the possibility of being directly readable by a human being, i.e. without any specific apparatus.

OBJECT OF THE INVENTION

In this context, the purpose of the invention is to propose a re-usable information recording medium, in which information is retained without consumption of energy, and which can also display information in a visible form for the human eye.

It is also an object of this invention to propose a corresponding method for recording information and a method for erasing a recorded medium of the invention.

SUMMARY OF THE INVENTION

The re-usable information recording medium of the invention, which comprises a sensitive layer, is mainly characterized in that said sensitive layer comprises, at least, a plurality of particles having a magnetically responsive position, and a retaining material having a temperature dependent viscosity and in which said particles are embedded, said particles and said retaining material exhibiting at least respective first and second light absorption spectra which are different one from the other.

Preferably, the retaining material is chosen so that its viscosity decreases when temperature increases.

In one possible embodiment of the invention, the particles used are optically anisotropic, either by their shape and/or by their color.

The sensitive layer may further comprise a stiffening material partitioning the retaining material into a plurality of domains.

In that case, the domains, or at least most of them, may be fully surrounded by the stiffening material.

The information recording medium of the invention may also further comprise a substratum to the upper face of which is bound the sensitive layer.

A transparent protective layer may be bound to the upper face of the sensitive layer.

Depending on the applications, the retaining material may preferably be transparent or merely translucent.

In a preferred embodiment of the invention, the particles used contain a ferromagnetic material having a predetermined Curie temperature, and the retaining material is chosen so as to have a melting temperature lower than the Curie temperature of the particles.

In one embodiment of the invention, each particle can selectively adopt a position of translation among a plurality of positions of translation comprising at least a first position relatively close to an upper face of the sensitive layer, and a second position relatively remote from said upper face of the sensitive layer.

In another embodiment of the invention, each particle can selectively adopt a position of rotation among a plurality of positions of rotation comprising at least first and second different orientations of the polar axis of this particle.

As the recording medium of the invention allows information to be recorded by a control of the position of translation or of the position of rotation of the particles with regard to the upper face of the sensitive layer, the recording medium may adopt a non-recorded or initial configuration, in which all the particles have the same position, or a recorded configuration, in which at least some different particles have respective different positions.

In a preferred embodiment of the invention, the particles and the retaining material exhibit respective first and second capacities of absorbing infra-red light, the first of which is higher than the second one.

Similarly, the particles and the retaining material advantageously exhibit respective first and second capacities of absorbing visible light, the first of which is higher than the second one.

The invention also relates to a method for recording various elements of information on respective different areas of the sensitive layer of an information recording medium of the type described, in which the viscosity of the retaining material decreases when temperature increases and in which all the particles have a same position of translation and/or rotation, this method mainly comprising the step of applying to the information recording medium a magnetic field component biasing the particles towards another position of translation and/or rotation, and the step of selectively heating said different areas as a function of said various elements of information.

The step of selectively heating the different areas of the sensitive layer advantageously comprises the step of selectively directing a light beam onto said different areas.

Although the sensitive layer may be heated by a bidimensional matrix of resistors, or by a matrix of light beams, the different areas of the sensitive layer may be sequentially and selectively scanned by a light beam by relative movement between the sensitive layer and the light beam.

For a higher efficiency, the light beam preferably has an infra-red energy component.

Shades in the recorded information may be obtained by modulating the light beam in time, i.e. heating different areas of the sensible layer by light impulses of different durations, and/or by modulating the light beam in energy, i.e. heating different areas of the sensible layer by light or light impulses of different wavelengths.

The invention also relates to a method for erasing information recorded on at least some areas of the sensitive layer of the information recording medium of the type described, in which the viscosity of the retaining material decreases when temperature increases, this method mainly comprising the step of applying to the information recording medium a magnetic field component along a fixed direction, and the step of heating all the areas of the sensitive layer.

Whenever the sensitive layer should exhibit high contrast, at least some of the different areas thereof may be heated up to complete melting of the retaining material.

DESCRIPTION OF THE DRAWINGS

The above and further objects and features of the present invention will be more apparent from the following detailed description of preferred embodiments of the invention, to be construed as non limiting examples of the inventive concept, the detailed description referring to the appended drawings in which FIG. 1 is a partial, enlarged, and vertical cross-sectional view of an information recording medium according to a first embodiment of the present invention;

FIG. 2 is a partial, enlarged, and vertical cross-sectional view of an information recording medium according to a second embodiment of the present invention;

FIG. 3 is a partial, enlarged, upper view of the information recording medium of FIG. 1;

FIG. 4 is a partial, enlarged, and vertical cross-sectional view of an information recording medium according to a third embodiment of the present invention;

FIG. 5 is a view similar to FIG. 2, illustrating a possible information recording method of the present invention;

FIG. 6 is a view similar to FIG. 2, illustrating a possible information erasing method of the present invention;

DETAILED DESCRIPTION OF THE PREFERRED EMBODIMENTS

Figure 7:
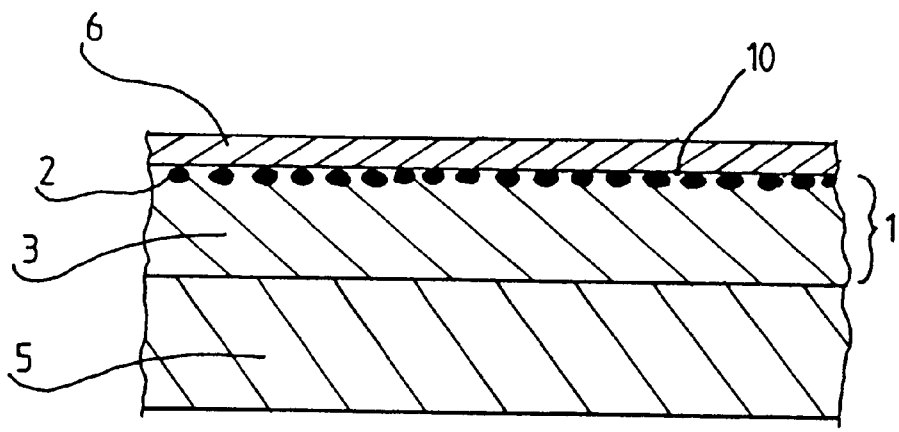
FIG. 7 is a partial, enlarged, and vertical cross-sectional view of an information recording medium according to a fourth embodiment of the present invention, shown in a non-recorded state.

The invention relates to a re-usable information recording medium provided with a sensitive layer 1.

According to the invention, the sensitive layer 1 comprises, at least, a plurality of particles 2 and a retaining material 3 in which the particles are embedded.

The particles 2 have the property of exhibiting a polar axis, at least under the influence of a magnetic field, and the property of being influenced by a magnetic field in such a way that they follow, either by a translation movement or by a rotation of their polar axis, a specific direction imposed by the magnetic field.

For instance, the particles 2 contain a ferromagnetic material, such as iron or any transition metal exhibiting the same property.

The retaining material 3 has a viscosity V(T) which depends on temperature T and which, in the preferred embodiment of the invention, decreases when temperature T increases, this material being ideally chosen to exhibit a solid-liquid phase transition for a relatively low temperature Tm, for instance less than 150° Celsius.

According to the invention, the particles 2 and the retaining material 3 are also chosen so that they have respective light absorption spectra which are substantially different one from the other.

Preferably, the retaining material 3 is transparent or at least translucent, while the particles have a dark or at least a clearly visible color, so that the particles have a stronger capacity of absorbing visible light as the retaining material and advantageously also a stronger capacity of absorbing intra-red light.

Whenever the use of the information recording medium of the invention requires such a low viscosity of the retaining material 3 that the retaining material should be melted, then the melting temperature Tm of the retaining material should be lower than the Curie temperature Tc of the particles, i.e. the temperature at which the particles 2 no longer can be oriented by a magnetic field.

For instance, the particles can be made of any dark ferromagnetic iron compound with a length or a diameter of 0.1 to 50 micrometers, while the retaining material can be paraffin.

As shown on FIGS. 1, 2, and 4 to 6, the recording medium of the invention may further comprise a substratum 5 to an upper face 51 of which the sensitive layer 1 is bound, and a transparent protective layer 6 bound to an upper face 10 of the sensitive layer 1.

The substratum can be made of any rigid or flexible support having bidimensional stability, such as paper, glass, polymeric film, etc., the transparent protective layer 6 being for instance made of glass or of a polymeric film.

As this will be more deeply explained hereunder, the basic principle of information recording used in the invention consists (i) in reducing, by heating, the viscosity of the retaining material, (ii) in selectively changing the rotation position or the translation position of the particles while the viscosity of the retaining material is sufficiently low to allow it, and (iii) in allowing the viscosity to increase again, by an interruption of the heating, so that the particles are retained in the position they adopted under the influence of the magnetic field.

In addition, the change of position of the particles is adequately chosen so as to entail a change in the optical aspect of the sensitive layer, due to the fact that the particles and the retaining material exhibit different light absorption spectra.

Figure 8:
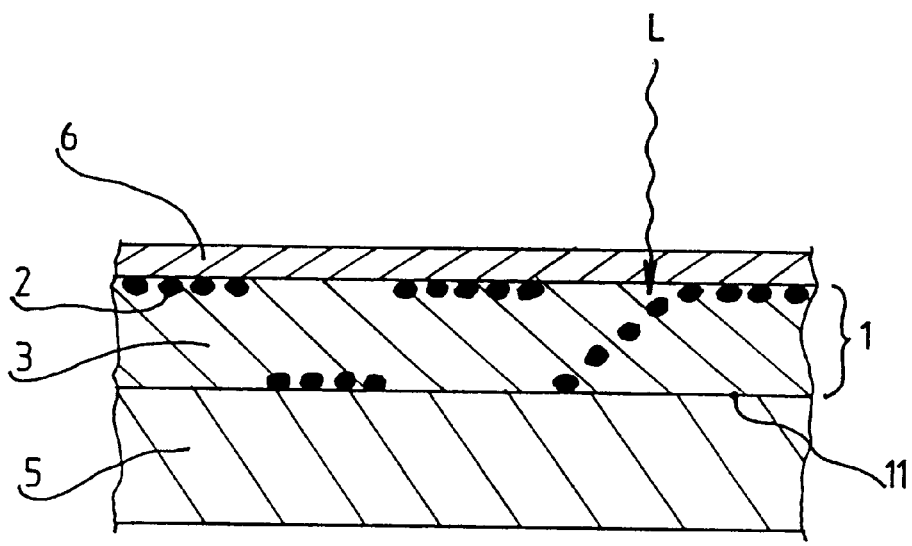
FIG. 8 is a view similar to FIG. 7, in which the recording medium is shown during recording of a negative image

The simplest embodiment, which will be specifically described thereafter in reference to FIGS. 7 and 8, consists in allowing the particles to migrate across the sensitive layer under the influence of the magnetic field, so that they can be more or less seen on the upper face of the sensitive surface.

Another embodiment, which will be commonly disclosed with the first one in reference to FIGS. 1 to 6, consists in using optically anisotropic particles, i.e. particles which exhibit optical properties or features which depend on the orientation of such particles.

For instance, the particles may have an oblong shape, so that they exhibit different overall dimensions in different directions.

In this case, referring now to FIG. 1 for instance, the visible surface offered by such oblong particles, when their length is substantially parallel to the upper face 10 of the sensitive layer 1, is more important than the visible surface they offer when their length is substantially perpendicular to the upper face 10.

As a result, areas of the sensitive layer 1 in which particles are parallel to the upper face 10 can visually be well distinguished from areas of the sensitive layer 1 in which particles are perpendicular to the upper face 10.

However, optical anisotropy could also be obtained with completely spherical and even identical particles, each of which would have different color, i.e. different light absorption properties, over its surface.

In whatever embodiment, the sensitive layer 1 may be directly supported by the substratum 5 as shown on FIG. 1.

But, as shown on FIGS. 2 to 6, the sensitive layer 1 may also further comprise a transparent stiffening material 4, for instance a transparent polymer, which partitions the retaining material 3 into a plurality of domains such as 31, 32, 33, 34.

Whenever the use of the information recording medium of the invention requires such a low viscosity of the retaining material 3 that the retaining material should be melted, then the stiffening material 4 should be in a solid state at the melting temperature Tm of the retaining material 3.

As particularly shown on FIGS. 2 and 3, the stiffening material 4 may define cells for the retaining material 3 and the particles embedded therein, the cells being placed side by side in a bidimensional matrix so as to form the sensitive layer.

However, as shown on FIG. 4, the domains 31, 32, 33, 34 delimited by the stiffening material 4 may be fully surrounded by the latter, so as to constitute closed capsules.

Each cell and each capsule may for instance contain from 1 to 100 particles, or even more, depending on the application and stiffness requirements of the sensitive layer.

In the case of oblong particles 2 having a direction D1 inclined over the upper face 10 of the sensitive layer 1 by a angle A1 relatively large, for instance equal or close to 90 degrees (as in cell 31 of FIG. 5), then the sensitive layer appears relatively clear, assuming that the retaining material is clear and the particles dark.

On the contrary, when oblong particles 2 have a direction D2 inclined over the upper face 10 of the sensitive layer 1 by a angle A2 relatively low, for instance equal or close to 0 degree (as in cell 35 of FIG. 5), then the sensitive layer appears relatively dark, still assuming that the retaining material is clear and the particles dark.

When such oblong particles 2 have an intermediate orientation, as in cells 33 or 34 of FIG. 2, then the sensitive layer takes an intermediate shade.

Before recording new information in the recording medium of the invention, it is convenient that the particles are all in the same initial state, for instance all oriented in the same direction, such as direction Dl in FIG. 5.

Recording various elements of information on respective different areas 31, 32, 33, 34 of the sensitive layer 3 is then performed by applying to the sensitive layer an appropriate magnetic field H2, in the present case a magnetic field along a second direction such as D2, inclined over the first direction D1, and by heating the different areas to be recorded, for instance the different cells 35, 36, 37, as a function of the various elements of information to be recorded therein.

As an illustration of the principle of the invention, FIG. 5 shows that cell 35 is being heated.

Assuming that the retaining material is clear and the particles dark, this indicates that information to be recorded in cell 35 is coded by "dark".

If information to be recorded in cell 36 is coded by "clear", then cell 36 will not be heated at all.

If information to be recorded in cell 37 is coded by "grey", i.e. between "dark" and "clear", then cell 37 will be heated, but with a smaller quantity of heating energy compared to the quantity of energy applied to cell 35, i.e. either during a shorter time or with a different spectrum, so that the particles in cell 37 will be impeded to fully align with the magnetic field H2 by the relatively high viscosity of the retaining material of cell 37, and that they will adopt an intermediate orientation such as the orientation shown in cells 33 and 34 of FIG. 2.

Although heating may be applied to the different areas of the sensitive layer by any means, and either sequentially or in parallel according to a bidimensional configuration, it is convenient to use a light beam L, for instance a laser beam with infra-red energy, which sequentially scans the different areas of the sensitive layer and which is either time-modulated or energy-modulated to successively and selectively heat the different areas according to the elements of information to be recorded therein.

Erasing all information recorded on the sensitive layer of the information recording medium of the invention can easily be performed, as shown in FIG. 6, by applying to the sensitive layer a magnetic field H1 along a fixed direction, for instance direction D1, and by heating all the surface of the sensitive layer 1, for instance by any appropriate heating apparatus 7.

FIGS. 7 and 8 illustrate the simplest embodiment of the invention, which may not only use optically anisotropic particles, but also optically isotropic particles, such as dark spherical particles as illustrated.

According to this embodiment, the particles are allowed to take at least two different positions of translation across the sensitive layer.

However, in the case of use of optically isotropic particles, the retaining material is preferably only translucent and not transparent, so as to allow a good contrast between the two different positions of translation of the particles.

FIG. 7 shows a non-recorded medium, for instance for the record of a negative image.

In such a case, all the particles 2 are close to the upper face 10 of the sensitive layer, so that the latter appears very dark.

FIG. 8 illustrates the recording of the negative image.

In this case, the magnetic field H is applied so as to attract particles 2 towards the lower face 11 of the sensitive layer 1.

As already described in reference to the preceding figures, each area of the sensitive layer 1 is heated or not, depending on the element of information to be recorded, particles 2 moving towards the lower face 11 of the sensitive layer 1 only in the areas which are heated.

What is claimed is:

1. A re-usable information recording medium, comprising a sensitive layer, said sensitive layer including (a) an upper face and a lower face, (b) a plurality of particles having a magnetically responsive position, (c) a retaining material having a temperature dependent viscosity and in which said particles are embedded, wherein said viscosity decreases when temperature increases, and (d) a stiffening material partitioning the retaining material into a plurality of domains;

a substratum, said sensitive layer being bound to an upper face of said substratum;

a transparent protective layer bound to an upper face of said sensitive layer;

wherein said particles and said retaining material exhibit at least respective first and second light absorption spectra which are different from each other, the particles comprising a ferromagnetic material and being selectively positionable in at least a first position adjacent the upper face of the sensitive layer and a second position adjacent the lower face of the sensitive layer; and said domains being placed side by side in a bidimensional matrix.

2. The information recording medium according to claim 1, wherein at least most of said domains are fully surrounded by said stiffening material.

3. The information recording medium according to claim 1, wherein said retaining material is transparent.

4. The information recording medium according to claim 1, wherein said retaining material is translucent.

5. The information recording medium according to claim 1, wherein said particles and said retaining material exhibit respective first and second capacities of absorbing infra-red light, the first of which is higher than the second one.

6. The information recording medium according to claim 1, wherein said particles and said retaining material exhibit respective first and second capacities of absorbing visible light, the first of which is higher than the second one.

7. The information recording medium according to claim 1, wherein said stiffening material is transparent.

8. The information recording medium according to claim 1, wherein said retaining material has a melting temperature at which said stiffening material is in a solid state.

9. The information recording medium according to claim 1, wherein each particle is selectively positionable in the first and second positions.

10. The information recording medium according to claim 1, wherein all particles of said plurality of particles are in the same first or second position.

11. The information recording medium according to claim 1, wherein said domains have a rectangular shape.

12. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said viscosity decreases when temperature increases; and (d) a stiffening material partitioning the retaining material into a plurality of domains, whereas said domains are fully surrounded by said stiffening materials; and said particles and said retaining material exhibiting at least respective first and second light absorption spectra which are different from each other, said particles being selectively positionable in at least a first position adjacent the upper face of said sensitive layer and a second position adjacent the lower face of said sensitive layer.

13. The information recording medium according to claim 12, wherein said domains have a rectangular shape and are placed side by side in a bidimensional matrix.

14. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said visosity decreases when temperature increases;

A substratum protective layer bound to an upper face of said sensitive layer;

said particles and said retaining material exhibiting at least respective first and second light absorption spectra which are different from each other;

said retaining material and said particles respectively having a melting temperature and a Curie temperature, and whereas said melting temperature is lower than the Curie temperature;

said retaining material being translucent; and said particles being selectively positionable in a least a first position adjacent the upper face of said sensitive layer and a second position adjacent the lower face of said sensitive layer.

15. The information recording medium according to claim 14, wherein each particle is selectively positionable in the first and second positions.

16. The information recording medium according to claim 14, wherein all particles of said plurality of particles are in the same first or second position.

17. The information recording medium according to claim 14, wherein said particles and said retaining material exhibit respective first and second capacities of absorbing infra-red light, the first of which is higher than the second one.

18. The information recording medium according to claim 14, wherein said particles and said retaining material exhibit respective first and second capacities of absorbing visible light, the first of which is higher than the second one.

19. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said viscosity decreases when temperature increases;

a substratum said sensitive layer being bound to an upper face of said substratum;

a transparent protective layer bound to an upper face of said sensitive layer;

said particles and said retaining material exhibiting respective first and second capacities of absorbing infra-red light, the first of which being higher than the second one; and said particles comprising a ferromagnetic material and being selectively positionable in at least a first position adjacent the upper face of said sensitive layer and a second position adjacent the lower face of said sensitive layer.

20. The information recording medium according to claim 19, wherein each particle is selectively positionable in the first and second positions.

21. The information recording medium according to claim 19, wherein all particles of said plurality of particles are in the same first or second position.

22. The information recording medium according to claim 19, wherein said retaining material is transparent.

23. The information recording medium according to claim 19, wherein said retaining material is translucent.

24. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said viscosity decreases when temperature increases;

said particles and said retaining material exhibiting respective first and second capacities of absorbing visible light, the first of which being higher than the second one;

said retaining material and said particles respectively having a melting temperature and a Curie temperature, and whereas said melting temperature is lower than the Curie temperature;

said retaining material being translucent; and said particles being selectively positionable in at least a first position adjacent the upper face of the sensitive layer and a second position adjacent the lower face of said sensitive layer.

25. The information recording medium according to claim 24, further comprising substratum, said sensitive layer being bound to an upper face of said substraum.

26. The information recording medium according to claim 24, further comprising a transparent protective layer bound to an upper face of said sensitive layer.

27. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said viscosity decreases when temperature increases, and (d) a stiffening partitioning the retaining material into a plurality of domains, whereas said stiffening material is transparent;

said domains being fully surrounded by said stiffening material; and said particles and said retaining material exhibiting at least respective first and second light absorption spectra which are different from each other, said particles being selectively positionable in at least a first position adjacent the upper face of said sensitive layer and a second position adjacent the lower face of said sensitive layer.

28. The information recording medium according to claim 27, wherein said domains are placed side by side in a bidimensional matrix.

29. The information recording medium according to claim 27, wherein said domains have a rectangular shape.

30. A re-usable information recording medium, comprising:

a sensitive layer, said sensitive layer including (a) an upper face and a lower face, (b) a plurality of particles having a magnetically responsive position (c) a retaining material having a temperature dependant viscosity and in which said particles are embedded, whereas said viscosity decreases when temperature increases, and (d) a stiffening material partitioning the retaining material into a plurality of domains;

said domains being fully surrounded by said stiffening material;

said particles and said retaining material exhibiting at least respective first and second light absorption spectra which are different from each other, said particles being selectively positionable in at least a first position adjacent the upper face of said sensitive layer and a second position adjacent the lower face of said sensitive layer, and said retaining material having a melting temperature at which said stiffening material is in a solid state.

31. The information recording medium according to claim 30, wherein each particle is selectively positionable in the first and second positions.

32. The information recording medium according to claim 30, wherein all particles of said plurality of particles are in the same first or second position.

33. A re-usable information recording medium, comprising a sensitive layer, wherein said sensitive layer comprises an upper face and a lower face, a plurality of particles having a magnetically responsive position, and a retaining material having a temperature dependent viscosity and in which said particles are embedded, said particles and said retaining material exhibiting at least respective first and second light absorption spectra which are different from each other, wherein the particles are selectively positionable in at least a first position adjacent the upper face of the sensitive layer and a second position adjacent the lower face of the sensitive layer, wherein said sensitive layer further comprises a stiffening material partitioning the retaining material into a plurality of domains.

34. The information recording medium of claim 33, wherein at least most of said domains are fully surrounded by said stiffening material.

35. The information recording medium of claim 33, wherein said stiffening material is transparent.

36. The information recording medium of claim 33, wherein said retaining material has a melting temperature at which said stiffening material is in a solid state.

37. A re-usable information recording medium, comprising a sensitive layer, wherein said sensitive layer comprises an upper face and a lower face, a plurality of particles having a magnetically responsive position, and a retaining material having a temperature dependent viscosity and in which said particles are embedded, said particles and said retaining material exhibiting at least respective first and second light absorption spectra which are different from each other, wherein the particles are selectively positionable in at least a first position adjacent the upper face of the sensitive layer and a second position adjacent the lower face of the sensitive layer, wherein said retaining material and the particles respectively have a melting temperature and a Curie temperature, and wherein said melting temperature is lower than the Curie temperature.

38. A re-usable information recording medium, comprising a sensitive layer, wherein said sensitive layer comprises an upper face and a lower face, a plurality of particles having a magnetically responsive position, and a retaining material having a temperature dependent viscosity and in which said particles are embedded, said particles and said retaining material exhibiting at least respective first and second light absorption spectra which are different from each other, wherein the particles are selectively positionable in at least a first position adjacent the upper face of the sensitive layer and a second position adjacent the lower face of the sensitive layer, wherein said particles and said retaining material exhibit respective first and second capacities of absorbing infra-red light, the first of which is higher than the second.

39. A re-usable information recording medium, comprising a sensitive layer, wherein said sensitive layer comprises an upper face and lower face, a plurality of particles having a magnetically responsive postion, and a retaining material having a temperature dependent viscosity and in which particles are embedded, said particles and said retaining material exhibiting at least respective first and second light absorption spectra which are different from each other, wherein the particles are selectively positionable in at least a first position adjacent the upper face of the sensitive layer and a second position adjacent the lower face of the sensitive layer, wherein said particles and said retaining material exhibit respective first and second capacities of absorbing visible light, the first of which is higher than the second one.

* * * * *